US011964277B2

(12) United States Patent
Olsen et al.

(10) Patent No.: US 11,964,277 B2
(45) Date of Patent: Apr. 23, 2024

(54) METERED VOLUME MICROFLUIDIC DEVICES

(71) Applicant: Hewlett-Packard Development Company L.P., Spring, TX (US)

(72) Inventors: David Olsen, Corvallis, OR (US); Si-lam J. Choy, Corvallis, OR (US); Paul Mark Haines, Corvallis, OR (US); Justin M. Roman, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 120 days.

(21) Appl. No.: 17/691,214

(22) Filed: Mar. 10, 2022

(65) Prior Publication Data

US 2023/0285964 A1 Sep. 14, 2023

(51) Int. Cl.

| | |
|---|---|
| ***G01N 33/68*** | (2006.01) |
| ***A01N 1/02*** | (2006.01) |
| ***B01L 3/00*** | (2006.01) |
| ***C07C 309/65*** | (2006.01) |
| ***C07C 309/73*** | (2006.01) |
| ***G01N 1/40*** | (2006.01) |
| ***G01N 21/01*** | (2006.01) |
| ***G01N 21/31*** | (2006.01) |
| ***G01N 21/33*** | (2006.01) |
| ***G01N 21/64*** | (2006.01) |
| ***G01N 27/414*** | (2006.01) |
| ***G01N 33/52*** | (2006.01) |
| ***G01N 33/532*** | (2006.01) |

(Continued)

(52) U.S. Cl.
CPC ... *B01L 3/502746* (2013.01); *B01L 2300/048* (2013.01); *B01L 2400/0487* (2013.01); *B01L 2400/0605* (2013.01); *B01L 2400/0622* (2013.01); *B01L 2400/082* (2013.01)

(58) Field of Classification Search
CPC ......... B01L 3/502746; B01L 2300/048; B01L 2400/0487; B01L 2400/0605; B01L 2400/0622; B01L 2400/082
See application file for complete search history.

(56) References Cited

U.S. PATENT DOCUMENTS

2004/0191125 A1* 9/2004 Kellogg ........... H01C 17/06586 422/72
2006/0257993 A1* 11/2006 McDevitt ........... G01N 21/6428 435/287.2

(Continued)

*Primary Examiner* — Jennifer Wecker
*Assistant Examiner* — Oyeleye Alexander Alabi
(74) *Attorney, Agent, or Firm* — Foley & Lardner LLP

(57) ABSTRACT

A metered volume microfluidic device can include fluid flow microfluidics. The fluid flow microfluidics can include an inflow channel, a metered volume chamber positioned to receive working fluid from the inflow channel, a metered volume outflow channel positioned to receive and direct a metered volume of the working fluid when discharged from the metered volume chamber, and a capillary check valve. The capillary check valve can allow excess working fluid to exit the metered volume chamber when filling the metered volume chamber via the inflow channel. The capillary check valve can also prevent excess working fluid that has passed there through from being reintroduced into the metered volume chamber when the working fluid is discharged into the metered volume outflow channel.

15 Claims, 4 Drawing Sheets

(51) Int. Cl.

| | |
|---|---|
| ***G01N 33/543*** | (2006.01) |
| ***G01N 33/569*** | (2006.01) |
| ***G01N 33/72*** | (2006.01) |
| ***G01N 35/00*** | (2006.01) |
| ***G01N 35/02*** | (2006.01) |
| ***G01N 35/04*** | (2006.01) |
| ***G01N 35/10*** | (2006.01) |

(56) References Cited

U.S. PATENT DOCUMENTS

2018/0171278 A1* 6/2018 Kiyama .................. C12M 29/00
2020/0316602 A1* 10/2020 Adamo .................. B01D 17/12
2022/0008928 A1* 1/2022 Colston, Jr. ............. B01F 23/41

* cited by examiner

METERED VOLUME MICROFLUIDIC DEVICES

BACKGROUND

Microfluidic devices are used in a variety of fields including biomedical, chemical, and environmental testing. These devices can involve the flow of very small volumes of fluid through microfluidic channels. Various devices can be designed to mix multiple fluids, dilute fluids, perform chemical reactions between fluids, measure properties of fluids, or process fluids in other ways. In some cases, the flow of fluids through a microfluidic device can be controlled using valves. Some microfluidic devices have included valves such as small rotary valves, ball spring valves, bubble valves, and others.

DETAILED DESCRIPTION

Figure 1:
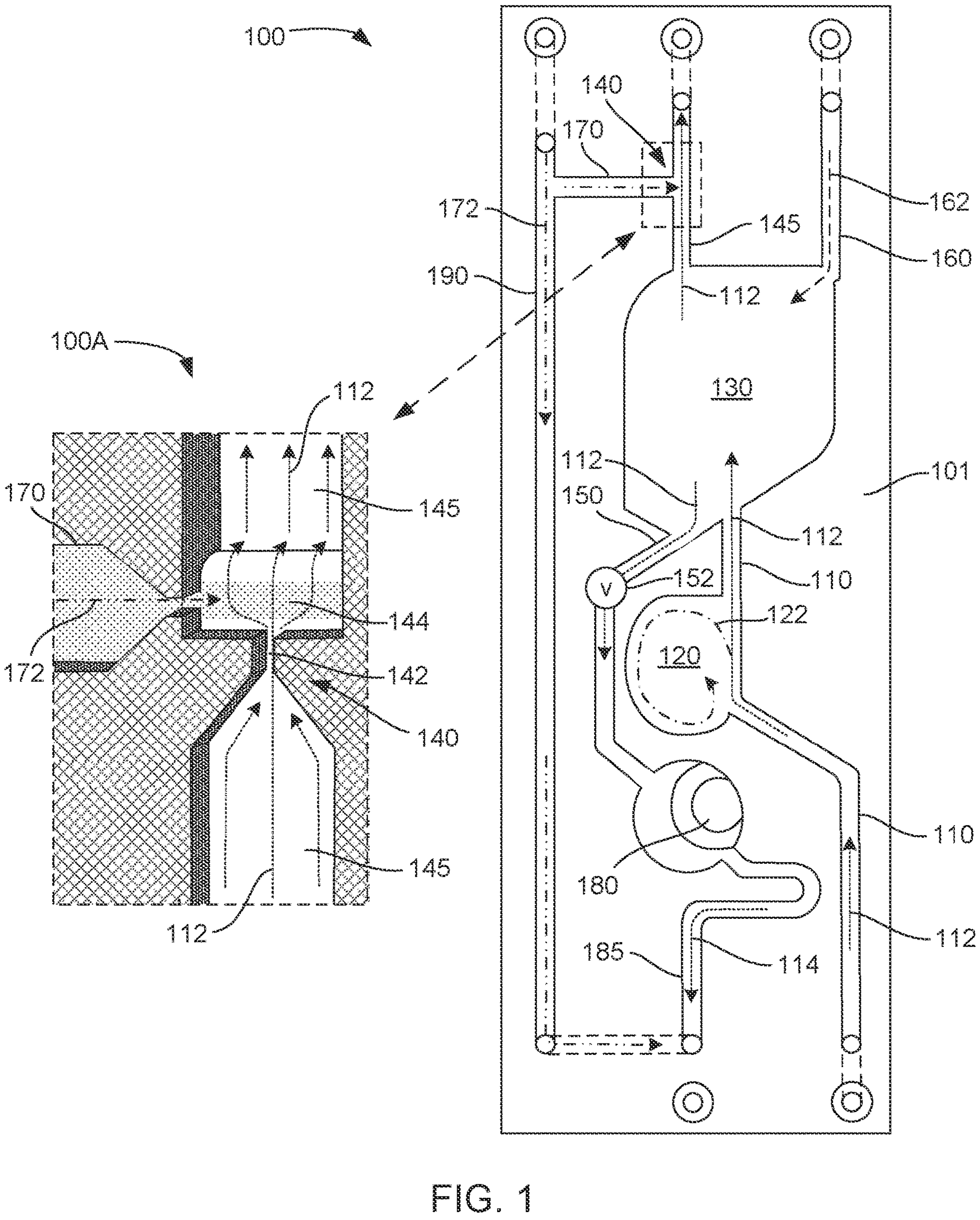
FIG. 1 is a schematic view of an example metered volume microfluidic device in accordance with the present disclosure.

The present disclosure is drawn to metered volume microfluidic devices, microfluidic systems, and methods of directing fluid through a metered volume microfluidic device. In accordance with the present disclosure, metered volume microfluidic devices described herein include fluid flow microfluidics. The fluid flow microfluidics in this example include an inflow channel, a metered volume chamber positioned to receive working fluid from the inflow channel, a metered volume outflow channel positioned to receive and direct a metered volume of the working fluid when discharged from the metered volume chamber, and a capillary check valve. The capillary check valve in this example allows excess working fluid to exit the metered volume chamber when filling the metered volume chamber via the inflow channel, and prevents excess working fluid that has passed there through from being reintroduced into the metered volume chamber when the working fluid is discharged into the metered volume outflow channel. In some examples, the metered volume microfluidic device can include a gas trap positioned along the inflow channel to trap gas, if present in the working fluid, prior to the working fluid being introduced into the metered volume chamber. In further detail, a pumping channel can be included to force the working fluid from the metered volume chamber and into the metered volume outflow channel. The outflow chamber can be associated with an outflow valve to prevent or allow working fluid flow there through. The capillary check valve can be configured to allow a liquid-gas interface to form therein with the gas introduced from the overflow chamber and the liquid introduced from the metered volume chamber, but under conditions used to discharge the metered volume channel into the metered volume outflow channel, the liquid-gas interface remains within the capillary check valve. A wetting channel can likewise be included to introduce a wetting fluid into the capillary check valve. A mixing chamber can be included to mix working fluid with a reagent to form a reaction mixture and to output the reaction mixture therefrom, wherein the mixing chamber is positioned downstream from the metered volume outflow channel. The fluid flow microfluidics can be formed in a substrate having microfluidic features formed therein. These features formed in the substrate can be closed with a sealing layer positioned on the substrate over the microfluidic features.

Microfluidic systems described herein include a metered volume microfluidic device that includes fluid flow microfluidics. The fluid flow microfluidics include, for example, an inflow channel, a metered volume chamber positioned to receive working fluid from the inflow channel, a metered volume outflow channel positioned to receive and direct a metered volume of the working fluid when discharged from the metered volume chamber, and a capillary check valve. The capillary check valve in this example allows excess working fluid to exit the metered volume chamber when filling the metered volume chamber via the inflow channel, and prevents excess working fluid that has passed there through from being reintroduced into the metered volume chamber when the working fluid is discharged into the metered volume outflow channel. In further detail, the microfluidic system includes an overflow chamber to receive the excess working fluid from the capillary check valve. The overflow chamber can be mounted on or included in the substrate, or can be a separate device that is fluidically connected to the capillary check valve. In some examples, the overflow chamber can be vented, creating an air barrier between excess working fluid received by the overflow chamber and the working fluid retained within the metered volume chamber for metered evacuation thereof. The microfluidic system can also include an inflow pump to pump working fluid and any gas contained therein along the inflow channel. The gas, e.g., air bubbles, can be separated from the liquid portion of the working fluid and collected in a gas trap prior to the working fluid being introduced into the metered volume chamber. The microfluidic system can also include an outflow pump fluidly coupled with a pumping channel to force the working fluid from the metered volume chamber and into the metered volume outflow channel in a manner that does not cause the working fluid in the metered volume chamber to pass through the capillary check valve while the metered volume chamber is being evacuated.

Methods of directing fluid through a metered volume microfluidic device include flowing a working fluid through an inflow channel and into a metered volume chamber, flowing excess working fluid not retained by the metered volume chamber to a location beyond a capillary check valve of an overflow channel, and discharging the working fluid present in the metered volume chamber into the metered volume outflow channel without reintroducing the excess working fluid beyond the capillary check valve back into the metered volume chamber while discharging the working fluid. In some examples, methods can include trapping and separating gas, e.g., air bubbles, from the working fluid prior to flowing the working fluid into the metered volume chamber. In other examples, methods can include introducing a liquid-gas interface in the capillary check valve that remains therein during discharge of the working fluid from the metered volume chamber and into the metered volume outflow channel.

It is noted that when discussing examples of metered volume microfluidic devices, microfluidic systems, and methods of directing fluids described herein, such discussions can be considered applicable to one another whether or not they are explicitly discussed in the context of that example. Thus, for example, when discussing an inflow channel in the context of metered volume microfluidic devices, such disclosure is also relevant to and directly supported in the context of a microfluidic systems and/or methods method of directing fluids, and vice versa.

Terms used herein will have the ordinary meaning in the relevant technical field unless specified otherwise. In some instances, there are terms defined more specifically throughout the specification or included at the end of the present specification, and thus, these terms can have a meaning as described herein.

Metered Flow Microfluidic Devices

A variety of microfluidic devices and rnicrofluidic processes can benefit from the control of the flow of fluid through microfluidics. For example, fluid flow microfluidics can be used with small quantities of fluids. However, it can be a challenge to design and manufacture microfluidic devices that can provide metered volumes of working fluids within relatively small tolerances. To fill a metered volume chamber and then dispense a working fluid contained therein within a relatively narrow range of liquid volume tolerances, minor engineering and/or improper processing techniques can thwart this goal. For example, in some instances, it may be difficult to fully fill a metered volume chamber free of interfering gas, e.g., air bubbles. Likewise, when evacuating or dispensing the metered volume of working fluid therefrom, other side channels may act to introduce unwanted fluids or some of the metered volume of working fluid may be lost to other side channels. Further, sometimes there may not be a full evacuation of the metered volume chamber, also calling into question if the correct volume within these tight tolerances was actually dispensed. This is particularly the case on such a small scale where microfluidic channels and small volumes of fluids are used. For example, a cross-sectional area (perpendicular to fluid flow) of a microchannel may have a channel diameter from about 1 mm down to about 1 μm (with equivalent cross-sectional areas for microchannels of other geometries, e.g., square, rectangular, etc.

As used herein, "working fluid(s)" is defined herein to include any fluid that may be introduced into or passed through the fluid flow microfluidics of the present disclosure for carrying out a task, e.g., accurate fluid dosing, fluid mixing and reacting, diagnostics, testing, chemical processing, buffering, washing, biologics processing, e.g., nucleic acid processing such as PCR assays, etc. Working fluids may be in the form of any liquid (including gas that may be initially present, but that may be removable in accordance with some examples of the present disclosure) that would benefit from dispensing at a metered volume, such as sample fluid, reconstitution buffer, wash buffer, reactant fluid, carrier fluid, master mix, drug and/or biologics dosing, etc. Working fluids may also be introduced for other tasks such as for washing, buffering, wetting, etc. Where there is more than one working fluid passing through a metered volume rnicrofluidic device and/or microfluidic system, the other working fluid(s) may be referred to as a "second working fluid," "third working fluid," etc. Various examples of "second working fluids" are described in greater detail hereinafter.

Figure 2:
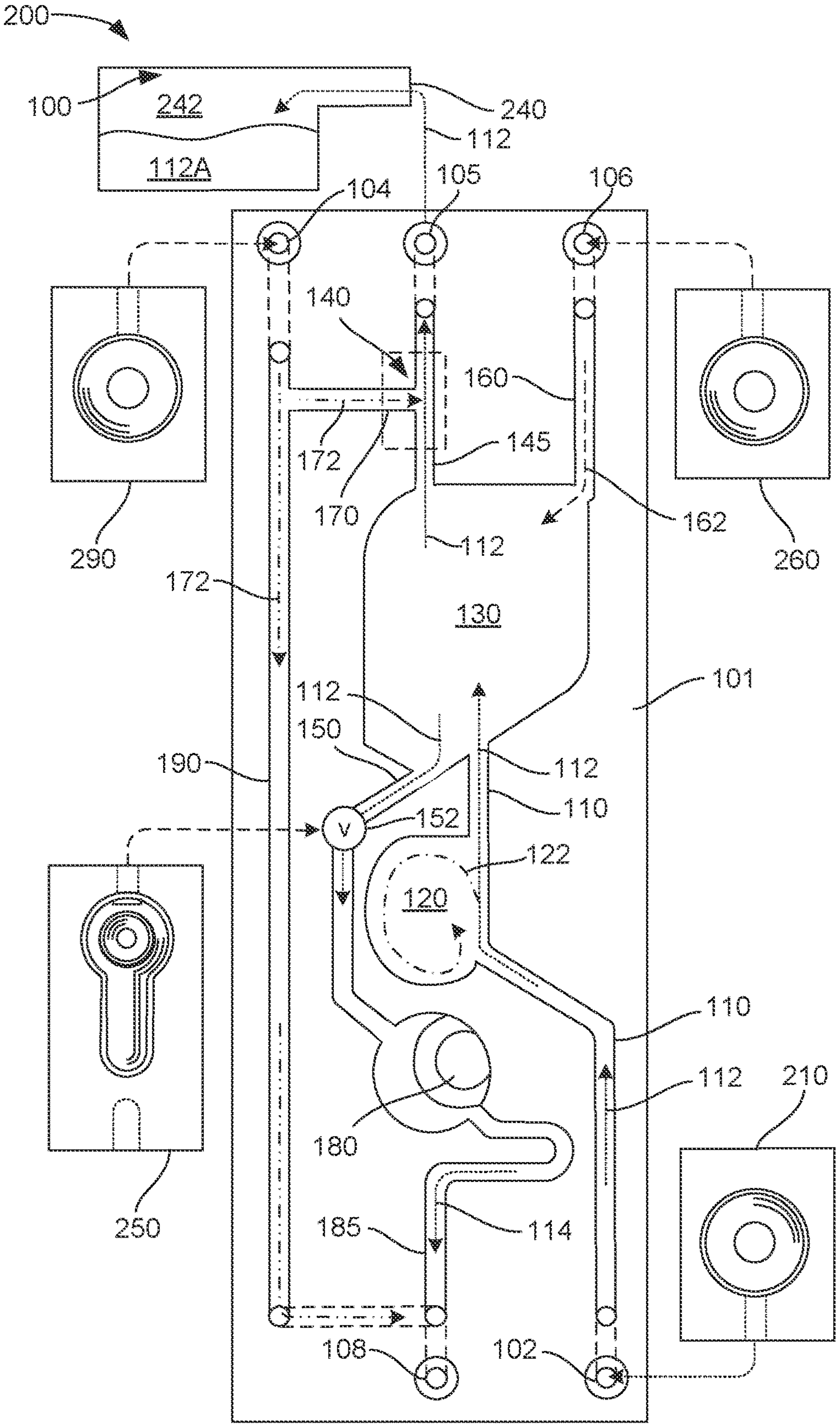
FIG. 2 is a schematic view of an example microfluidic system in accordance with the present disclosure.
Figure 4:
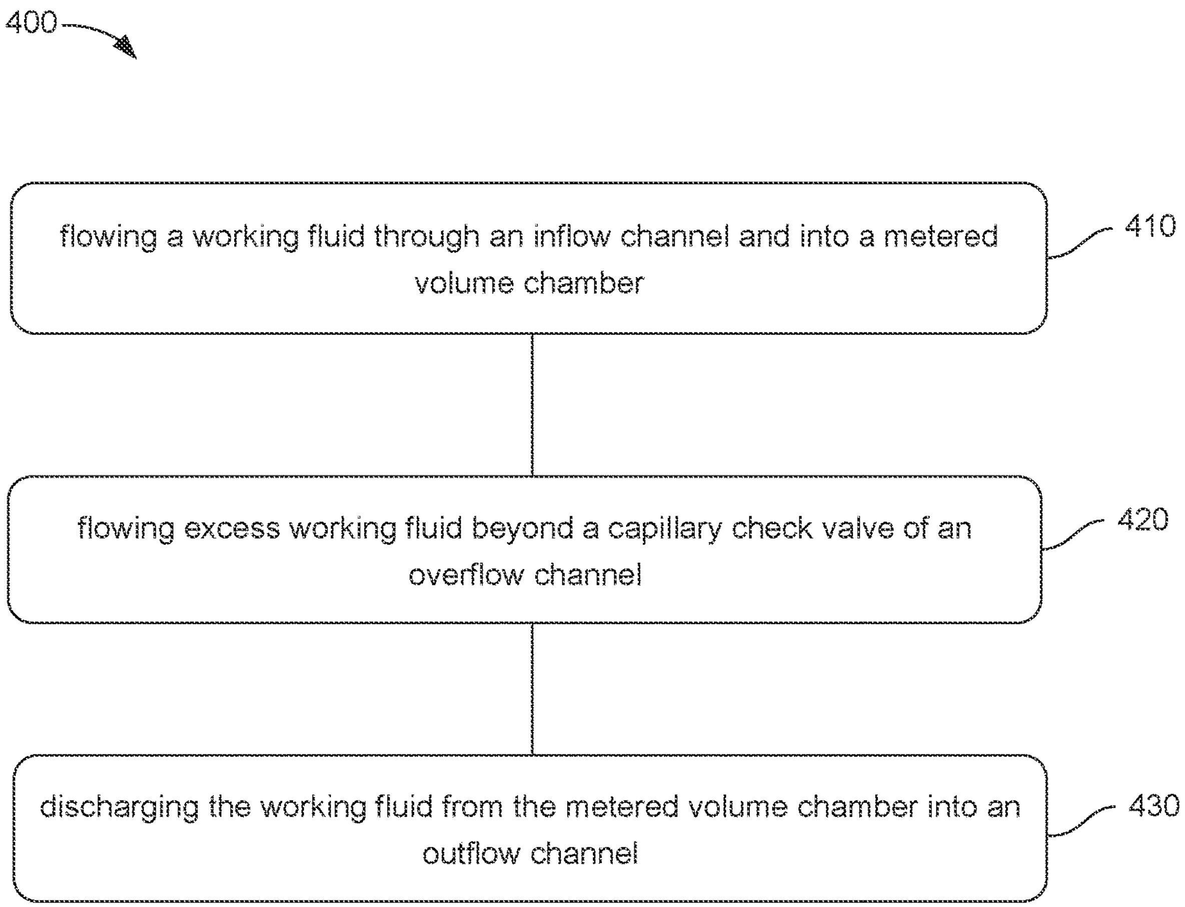
FIG. 4 is a flow chart depicting an example method of directing fluids through a metered volume microfluidic device in accordance with the present disclosure.

With that stated, to clearly describe features of the present disclosure, though any of a number of types of working fluids can be dispensed as metered volumes using the fluid flow microfluidics described, the example of nucleic acid process, e.g., PCR assays, is used to describe the various features and/or components as they relate to the "working fluid" in the examples shown and described in FIG. 1 (the metered volume microfluidic devices), FIG. 2 (the microfluidic systems), and/or FIG. 4 (the methods of directing fluid through a metered volume microfluidic device). In this particular example, the working fluid may be a reconstitution buffer that can be dispensed in a metered volume to a mixing chamber for reaction with a reactant compound, e.g., reactant pellet. Furthermore, in this particular example, a second working fluid that may be used includes a wash buffer, which can be used to wash reactants or reaction mixtures and/or can also be used as a wetting fluid for use with a capillary check valve, as described in greater detail hereinafter. This example is for convenience to illustrate one use and arrangement of microfluidics that would benefit from the present technology. However, it is understood that other types of working fluids can be used where there may be a benefit to small quantity metered volume dispensing or dosing.

Referring now more specifically to FIG. 1, example metered volume microfluidic devices 100 can include a substrate 101 associated with multiple types of fluid flow microfluidics. The fluid flow microfluidics in this example include fluid flow channels, various chambers, openings for introduction or egress of fluids, vents, and the like. More specifically, the fluid flow microfluidics in this example include an inflow channel 110, a metered volume chamber 130 positioned to receive working fluid 112 from the inflow channel, a metered volume outflow channel 150 positioned to receive and direct a metered volume of the working fluid when discharged from the metered volume chamber, and a capillary check valve 140 positioned along a venting channel 145. The capillary check valve in this example allows excess working fluid to exit the metered volume chamber when filling the metered volume chamber (via the inflow channel). The capillary check valve also prevents the excess working fluid that has passed there through from being reintroduced into the metered volume chamber when the working fluid is discharged into the metered volume outflow channel. In further detail, the capillary check valve, which is positioned along the venting channel, is shown in greater detail at expanded view 100A. In this example, the capillary check valve includes a capillary slot 142 that will allow passage of the working fluid 112 (in the direction of the arrows shown) while the metered volume chamber is being filled. A wetting fluid 170 can be introduced from a wetting channel and into a wetting region 144 of the capillary check valve. By introducing the wetting fluid beyond the capillary (relative to the metered volume chamber), fluid flow there through can be further promoted or enhanced in some examples. When the metered volume chamber is being emptied or evacuated (via the metered volume outflow channel), the capillary check valve resists ingress or egress into the venting channel.

As a more specific example, in the instance of a metered volume microfluidic device for PCR assays or other PCR processing, the working fluid 112 may be a reconstitution buffer for reconstitution of a reactant, and the second working fluid 172 may be a wash buffer, for example. In this particular example, the wash buffer can be introduced into a second working fluid channel 190 that includes a wetting channel 170 (branched off from the second working fluid channel) to deliver the second working fluid (which at this location acts as a wetting fluid) to the wetted region 144 of the capillary check valve 140. Thus, the reconstitution buffer can be dispensed at a metered liquid volume through a metered volume outflow channel 150 and into a mixing chamber 180. The mixing chamber may include a reactant solid or liquid, but in one example, the reactant may be a reactant pellet that is reconstituted by the reconstitution buffer. An outflow valve 152 can be present to prevent premature outflow of the working fluid (reconstitution buffer in this example) while the metered volume chamber 130 is being filled. Upon reconstitution of the reactant pellet, a reaction mixture 114 is formed that can be passed through a reaction mixture outflow channel 185. In further detail regarding the outflow valve 152, this can be an actuatable valve that opens and closes, or it can be a one-time use valve that is initially closed (during the fill of the metered volume chamber 130) and then is opened when delivering the metered volume of liquid working fluid 112 from the chamber and into/through the metered volume outflow channel 150.

In some examples, the metered volume microfluidic device can include a gas trap 120 positioned along the inflow channel to trap gas 122, e.g., air bubbles, if present initially in the working fluid, so that the working fluid introduced to the metered volume chamber is free of gas bubbles or the volume of gas bubbles is reduced sufficiently so that the metered volume of working fluid is within acceptable tolerances, e.g., from 0 vol % to 10 vol %, from 0 vol % to 8 vol %, or from 0 vol % to 5 vol % gas remaining in the working fluid. Thus, the gas trap provides a way to remove unwanted gas, e.g., air bubbles, from the working fluid so that the metered volume chamber receives a liquid volume of the working fluid content (with gas removed or mostly removed), and the capillary check valve allows for overfilling of the metered volume chamber with the excess working fluid passing through an essentially one-way passive valve. Either of these features alone may assist in getting a more accurate metered volume of working fluid in the metered volume chamber for dispensing therefrom.

In further detail, a pumping channel 160 can be included to force the working fluid 112 from the metered volume chamber 130 and into the metered volume outflow channel 150. A pumping fluid 162, which may be air or other gas, can be pumped through the pumping channel and into the metered volume chamber 130 to displace the working fluid, forcing it into the metered volume outflow channel 150. The metered volume outflow chamber can be associated with an outflow valve 152 to prevent or allow working fluid to flow there through. The capillary check valve 140, as previously described, provides an essentially one-way valve where excess working fluid can be passed there through, but under the pressures used to displace and deliver the working fluid from the metered volume chamber and into the metered volume outflow chamber, working fluid is neither substantially lost to or reintroduced from the venting channel 145 that contains the capillary check valve. In other words, the capillary check valve can be configured to allow a liquid-gas interface to form therein with the gas introduced from the overflow chamber and the liquid introduced from the metered volume chamber, but under conditions used to discharge the metered volume channel into the metered volume outflow channel, the liquid-gas interface remains within the capillary check valve. As an example, the holding pressure of the capillary check valve 140 can depend on several factors, including how far the outflow valve 152 is from is from capillary check valve in a direction of gravity forces. To provide a theoretical example based on the metered flow microfluidic device 100 shown in FIG. 2, if the distance between the capillary check valve and the outflow valve is about two inches, then the holding pressure may be about five inches $H_2O$ (1200 Pa), which may provide about three inches protection from drooling if the metered flow microfluidic device were to be pumped, for example. Higher holding pressures can be tolerated well, although at some point, the capillary check valve can start to restrict working fluid 112 flow if it is too small. Thus, in some examples, a reasonable operating range of pressures may be from about 5 inches to about 20 inches $H_2O$ which correlates to from about 1,200 Pa to about 5,000 Pa. Other operating pressure ranges may be from about 1,500 Pa to about 4,000 Pa or from about 1,500 Pa to about 3,000 Pa.

In further detail, as will be made clear by discussion of the microfluidic systems shown by way of example in FIG. 2, there may be an overflow chamber with an air gap that can prevent most reintroduction of working fluid back into the metered volume chamber.

Microfluidic Systems

Turning now to FIG. 2, an example of the microfluidic systems 200 of the present disclosure is shown. The microfluidic system may include all of the same details are shown and described with respect to the metered volume microfluidic devices 100 of FIG. 1, and those features as described are incorporated herein to this example microfluidic system 200. Features previously described that can be included as part of the microfluidic system include features such as a substrate 101, inflow channel 110, gas trap 120, metered volume chamber 130, capillary check valve 140, metered volume outflow channel 150, pumping channel 160, wetting channel 170, mixing chamber 180, second working fluid channel 190, and the like. Various types of materials may be used with and/or flow through these or other features, including reactant (e.g., solid pellet, particulates, liquid, etc.), working fluid 112 (e.g. sample fluid, reconstitution buffer, etc.), trapped gas 122 (e.g., air bubbles separated out from the working fluid), pumping fluid 162 (e.g., air or other gas to displace working fluid when dispensing from the metered volume chamber), reaction mixture 114 (e.g., working fluid admixed or reacted with reactant when contacted at the mixing chamber 180), etc.

In further detail with respect to the microfluidic systems 200 shown by way of example in FIG. 2, there can be other components that are either included on the substrate 101, or which may be fluidically connected to various ports also present on the substrate. For example, there can be components present on the back side of the substrate, on the front side of an alternatively configured metered volume microfluidic device 100, or positioned somewhere not onboard the substrate, but connected by fluidic channels. In one example, an overflow port 105 can lead to the overflow chamber 240 that is not onboard the substrate, or alternatively, the overflow port can lead to the overflow chamber at a location on a backside of the substrate. In further detail, the same can be the case for some of these other components including as it relates to fluid pumps, fluid sources, density gradient column receiving vessels, assay devices, etc.

The microfluidic systems 200 of this example can further include various ports, such as a working fluid port 102, a second working fluid port 104, an overflow port 105, a metered volume chamber pumping port 106, and a drain 108. Fewer or more ports may be included, depending on the nature of the metered volume microfluidic device 100 in operation. In this example, there may be a pump or multiple pumps for carrying out various tasks, such as pumping fluid(s) into or through the various microfluidic channels and/or chambers, opening and/or closing valves, displacing other fluids, etc. Pumps can be automatically or manually actuated and/or can be mechanically or electro-mechanically actuated, for example. In one instance, one pump or multiple pumps may include blister packs that carry fluid, e.g., gas and/or liquid. In this instance, when the blister pack is depressed, fluid is introduced into or through various microfluidic features, e.g., channels, chambers, etc. Fluid(s) pumped using the blister packs may be working fluid(s), or may be a fluid used to displace or otherwise pump a working fluid, e.g., air used to displace a working fluid from a chamber. Example blister packs are shown by way of example at 210, 250, 260, and 290 in FIG. 2, and in additional detail in FIGS. 3A to 3C hereinafter.

As shown in FIG. 2, a working fluid pump 210 (blister pack or otherwise) can be used to introduce a working fluid 112 into an inflow channel 110 via a working fluid port 102. A second working fluid pump 290 (blister pack or otherwise) can be used to introduce a second working fluid 172 into a second working fluid channel 190 via a second working fluid port 104. The second working fluid channel in this instance includes a wetting channel 170 that is branched off of the second working fluid channel, which can be used to wet a capillary check valve 140, for example. An outflow pump 260 (blister pack or otherwise) can be used to introduce a pumping fluid 162, e.g., air or other gas, into a metered volume chamber 130 to displace working fluid into a metered volume outflow channel 150. The metered volume outflow channel can be associated with an outflow valve 152. In one instance, the valve may be closed by the introduction of a fluid, e.g., grease or non-Newtonian fluid, therein using an outflow valve pump 250 (blister pack or otherwise).

In further detail, the microfluidic systems 200 can further include an overflow chamber 240 that is fluidically connected to the venting channel 145 downstream from the capillary check valve 140. In other words, the overflow chamber is separate from the metered volume chamber 130 by the capillary check valve. This can provide an air gap 242 separating excess working fluid 112A that has passed through the capillary check valve. This air gap provides a barrier preventing reintroduction of the excess working fluid back into the metered volume chamber when dispensing the working fluid therefrom. The excess working fluid collected in the overflow chamber represents working fluid that is pumped in excess (by volume) into the metered volume chamber. This can help provide for a fully filled metered volume chamber where excess working fluid (after filling the metered volume chamber) would be routed through the venting channel (where the capillary check valve resides) and into the overflow chamber on the other side of an air gap.

Referring now to FIG. 1 and FIG. 2 collectively, a more specific example related to the use of the metered volume microfluidic devices 100 and microfluidic systems 200 is provided as it relates to sample preparation for subsequent nucleic acid processing, e.g., PCR assays, amplification, etc. In this example, the working fluid 112 is a reconstitution buffer (RB) and the second working fluid 172 is a wash buffer (WB), a portion of which is used as a wetting fluid. In this example, wash buffer can be dispensed, for example, into a fluid gradient container (not shown, but can be delivered through drain 108). Valving can be used to control the order of fluid flow and ameliorate unwanted fluid mixing. These devices and systems can likewise be used to meter volumes of reconstitution buffer (or other working fluids), manage excess fluid disposal, and in some examples, capture unwanted air/gas bubbles (e.g., prior to metering) and direct flow for reconstitution buffer mixing and dispensing. For example, the use of a gas trap 120 and a capillary check valve 140 in some examples may work together to provide for an accurately dispensed metered volume of reconstitution buffer by removing gas prior to filling the metered volume chamber so that the metered volume chamber may be filled with liquid content rather than a mixture of liquid and gas. Additionally, the capillary check valve can be positioned between the metered volume chamber and an overflow volume chamber 240 (or other microfluidics) so that excess reconstitution buffer can be injected into the metered volume chamber to ensure it gets filled to the full volume, e.g., reconstitution buffer fills the metered volume chamber and excess reconstitution buffer passes to the overflow volume chamber through the capillary check valve, thus keeping the overflow volume separated from the metered volume chamber by an air/liquid interface. The air/liquid interface may reside at or about the capillary check valve and/or there may be an air gap 242 at or in the overflow chamber to prevent reintroduction of excess reconstitution buffer into the metered volume chamber.

In greater detail in this example, if there is a benefit to dispensing a precise volume of reconstitution buffer to react with a lyophilized pellet, e.g., within 10 vol % of a predetermined volume, then the devices and systems can be used to carry this out. For example, if 50 μL (+/−5 μL) is what is needed to dissolve a lyophilized pellet carried in the mixing chamber 180, then this volume could be reliably dispensed from the metered volume chamber 130, through the metered volume outflow channel 150, and into the mixing chamber for reconstitution of the lyophilized pellet for dispensing as a reaction mixture 114 and into a density gradient column (not shown), such as through drain 108. A blister pack can be relatively precise, but not typically within the 10 vol % tolerance described by this example. For example, a blister pack can be accurate within about +/−20 μL in many instances. When delivering small volumes such as 50 μL in this example, a +/−20 μL is not adequately precise. This is because blister fill volumes and/or fluid evacuation may not be adequately controllable with small volumes to be particularly accurate. In this example, the metered volume chamber may be molded or otherwise formed in the substrate 101 and an upper chamber wall (in the z-direction) can be provided by film or overlay. Working fluid pump 210, which is a blister pack in this instance, pushes a volume of the reconstitution buffer into the metered volume chamber, with an excess amount of the reconstitution buffer passing there through into a venting channel with a capillary check valve. If the metered volume chamber is 50 μL in volume, then when it is filled and excess passed through, the volume of the working fluid or reconstitution buffer will be known within relatively narrow tolerances, e.g., less than 10 vol % variability. When air or other gas is pushed into the filled metered volume chamber, the 50 μL (+/−5 μL) from outflow pump 260 (which is also a blister pack in this example), reconstitution buffer can be pushed by backpressure into the reaction chamber for reaction with the lyophilized pellet. The capillary check valve and/or the overflow chamber work to prevent reconstitution buffer from being reintroduced during evacuation of the metered volume chamber.

To further provide accurate delivery of the 50 μL of reconstitution buffer as a liquid, it is understood that the reconstitution blister pack (working fluid pump 210) can sometimes deliver entrained air with the reconstitution buffer liquid. Entrained air can consume volume in the metered volume chamber, thus reducing the volume of reconstitution buffer liquid contained within the metered volume chamber 130. As the air can coalesce and form larger bubbles that may not be passed through any vents, this can also impact the accuracy of volume sent to the mixing chamber 180 to reconstitute the lyophilized pellet. Thus, a small side chamber 120 is configured to trap air as the reconstitution buffer is passed through the inflow channel 110 and into the metered volume chamber. As a result, a more accurate volume of reconstitution buffer as a liquid can be used to fill the metered volume chamber, a portion of which passes excess reconstitution buffer through the capillary check valve 140. The depth of the chamber used as the gas trap can be greater than the depth of the inflow channel, both of which may be formed in the substrate 101, to encourage air or other gas to move out of the inflow channel and into the gas trap. Once the air or other gas is trapped, the liquid remains for introduction into the metered volume chamber.

In further detail, where the second working fluid 190 is a wash buffer, a second working fluid port 104 can deliver the wash buffer into a second working fluid channel 190. Like the reaction mixture 114 used to form a layer of the density gradient column (not shown), the wash buffer can likewise be delivered via drain 108 to the density gradient column. If the reaction mixture is of one density and the wash buffer is of another density, the density gradient column can be formed with two (or more) phase separated layers of these fluids. Also in this example, a small portion of the wash buffer can be diverted as a wetting fluid to prime/wet the capillary check valve 140, as previously described. This capillary valve can be designed to withstand a pressure of about 10" water column, and thus allow liquids to pass above this pressure. Once the capillary check valve is wetted, the valve can not only protect backflow of the reconstitution buffer when dispensing, but can also prevent wash buffer backflow. Thus, in examples of the present disclosure, the capillary check valve can be pre-wetted with an opportunistic fluid that is already being flowed through the device, performing multiple functions such as passively controlling venting and displacing excess working fluid as waste or for use otherwise. Furthermore, during filling of the metered volume chamber, excess fluid can pass through the capillary check valve to be vented out (not to return) at a pressure above that which the capillary check valve would otherwise prohibit. Once the working fluid passes through the capillary check valve, the valve remains closed for dispensing the reconstitution buffer from the metered volume chamber.

In further detail regarding the blister packs that can be used as pumps as shown in FIG. 2, any of a number of configurations can be used. One type of blister pack is shown at 210, 260, and 290, which are blister packs used to introduce a fluid to a channel. The blister pack shown at 250, on the other hand, is a blister pack that may be used to open up the outflow valve 152, which is normally-closed. As mentioned, these blister packs can be positioned over a sealing layer (not shown) that closes the microfluidics from above, or can be a separate structures that can be fluidically connected to the microfluidics.

Alternatively, in some examples, outflow valve 152 can be located at locations other than along the metered volume outflow channel 150. For example, the outflow valve could alternatively located at drain 108, or between the drain and mixing chamber 180 along the reaction mixture outflow channel. In any of these instances, the outflow valve can protect the capillary check valve 140 from wash buffer backflow into reaction mixture outflow channel 185. This can likewise work because the capillary has been wetted (filled) with wash buffer when it is first dispensed as the second working fluid 172 through the second working fluid channel 190 via wetting channel 170 that is branched off therefrom. In this example, prior to filling with reconstitution buffer as the working fluid 112, as previously described, the capillary check valve 140 may include a fluid/air interface on both sides of the capillary slot (shown at 142 in FIG. 1), so dislodging the working fluid from within the capillary slot may be resisted by capillary forces in both directions.

Figure 3A:
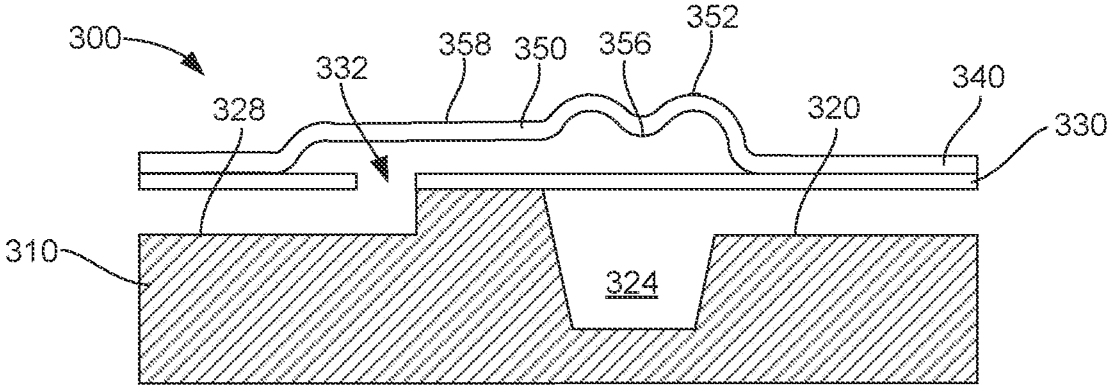
FIGS. 3A-3C depict multiple examples of blister packs that can be used as pumps with the metered volume microfluidic devices, microfluidic systems, and/or methods of directing fluids in accordance with the present disclosure.
Figure 3B:
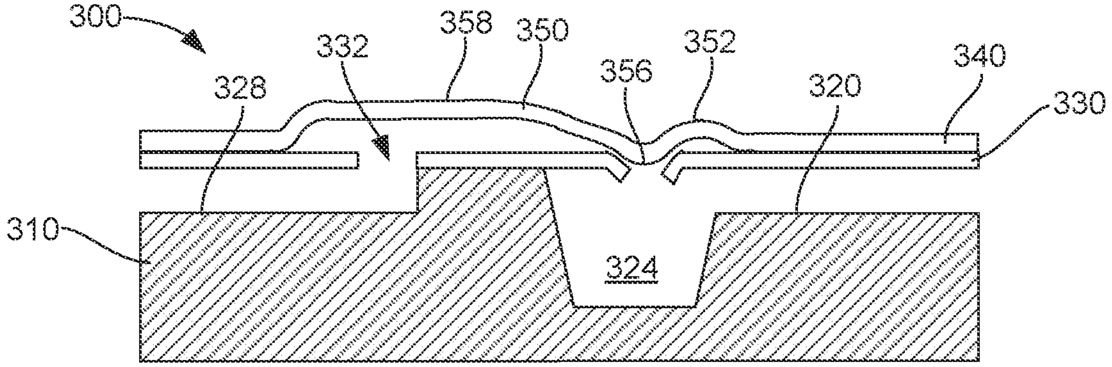
Figure 3C:
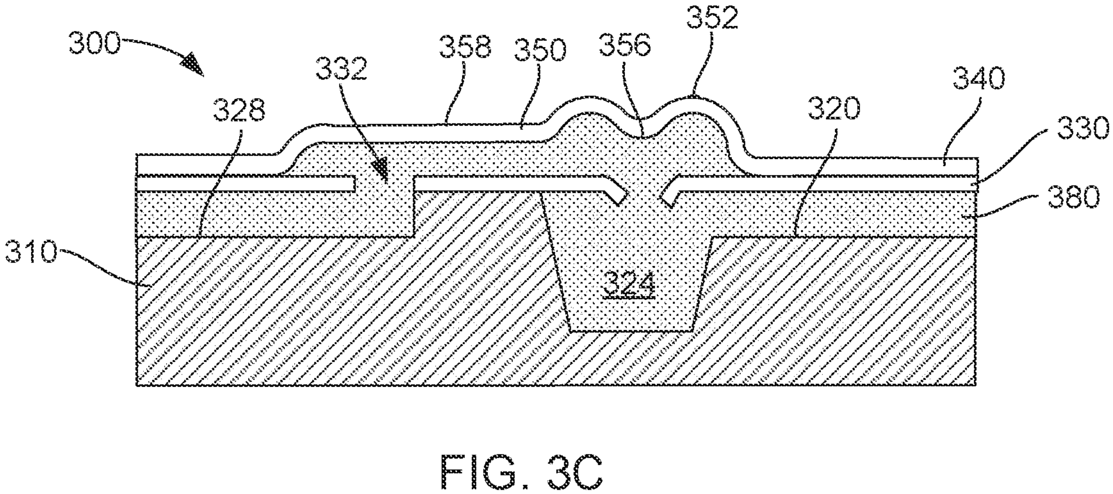

FIGS. 3A-3C show this type of blister pack 300 that can be used to open a valve at a point in time when the working fluid is to be dispensed from the metered volume chamber. In this example, side cross-sectional views are shown that include a substrate 310, a sealing layer 330 over the substrate, and a flexible blister layer 340 over the sealing layer. The substrate includes a first microfluidic channel 320, a second microfluidic channel 328, and an opening well 324 connected to the first microfluidic channel. A blister 350 is formed in the flexible blister layer. This blister includes an opening blister segment 352 and a connecting blister segment 358. The opening blister includes a puncturing point 356 oriented downward toward the sealing layer. The connecting blister segment extends to a pre-formed opening 332 in the sealing layer. The pre-formed opening connects to the second microfluidic channel, so that the second microfluidic channel is in fluid communication with the blister volume inside the blister. FIG. 3B shows the normally-closed microfluidic valve as the opening blister is being pressed. The puncturing point punctures the sealing layer above the opening well. This places the opening well and the first microfluidic channel into fluid communication with the blister and the second microfluidic channel. When the pressing force is removed from the opening blister, the opening blister can rebound somewhat and leave a clear passageway through the punctured hole in the sealing layer. Fluid can then flow freely from the second microfluidic channel to the first microfluidic channel or vice versa. FIG. 6C shows the microfluidic valve after liquid 380, such as a plugging fluid, has flowed through the second microfluidic channel, into the blister volume, and then into the first microfluidic channel, thus, opening the outflow valve for flow of the working fluid through the metered volume outflow channel as previously described.

In further detail regarding valving, there can be other types of valves present other than the capillary check valve and/or the outflow valve previously described. There may be use for valves that are normally closed (as described with respect to the blister pack shown in FIGS. 3A to 3C), normally open valves, or other valve types. For example, mechanisms can be in place for pressing busters, such as a robotically-controlled piston. Alternatively, these blisters can be depressed manually. For example, a microfluidic valve as described herein includes a substrate with a microfluidic channel formed in the substrate with a sealing layer positioned over the microfluidic channel. A flexible blister layer can be positioned over or near the sealing layer. The flexible blister layer may include a blister that has the form of a distended, bulging portion of the flexible blister layer. This leaves a space between the bulging flexible blister layer and the sealing layer, which space may be referred to as a "blister volume." The microfluidic valve can be actuated by pressing the blister, which can puncture the sealing layer beneath the blister. Depending on whether the microfluidic valve is a normally-open valve or a normally-closed valve, pressing the blister can cause the valve to either block fluid flow through the microfluidic channel, or to allow fluid flow through the microfluidic channel, respectively. In the case of the metered volume microfluidic device shown in FIGS. 1-3, the valve can be initially closed, and by pressing the blister, the valve can be opened, as mentioned previously. For example, if the outflow valve is initially closed as "a normally closed valve," then fluid flow there through does not occur. Then, the valve can be actuated to switch the valve from blocking fluid flow to allowing fluid flow, e.g., switching from closed to open, and then the fluid can flow after the valve has been opened. Regardless of the blister pack being used, e.g., for valve, fluid flow, fluid pumping, etc., by pressing the blister, a gas, liquid, plugging fluid, etc., can be used to carry out a specific task or tasks. If the fluid is being used for a valve, e.g., a plugging fluid, then the fluid may be a shear-thinning fluid, Bingham plastic fluid, viscoplastic fluid, curable fluid, etc. In some examples, when the blister is pressed to inject or remove a plugging fluid from a location within the device and/or system, the force applied to the blister can be from 10 Newtons ($kg \cdot m \cdot s^{-2}$) to 40 Newtons ($kg \cdot m \cdot s^{-2}$), or from 10 Newtons ($kg \cdot m \cdot s^{-2}$) to 20 Newtons ($kg \cdot m \cdot s^{-2}$), or from 20 Newtons ($kg \cdot m \cdot s^{-2}$) to 40 Newtons ($kg \cdot m \cdot s^{-2}$). Other forces may be more appropriate when introducing fluids for fluid flow and/or pumping other fluids.

As used herein, "viscoplastic fluid" refers to materials/fluids that experience irreversible plastic deformation when stress over a certain level is applied. When stress under this level is applied, the viscoplastic fluid can behave as a rigid body, as is the case with Bingham plastic fluid, or the viscoplastic material can undergo reversible elastic deformation. "Bingham plastic fluid" is one type of viscoplastic fluid and refers to a class of materials that behave as rigid bodies at low stress but which flow as a viscous fluid at high stress. The transition between the rigid body behavior and the viscous fluid behavior can occur at various different stress levels, depending on the particular Bingham plastic material. Bingham plastics can include greases, slurries, suspensions of pigments, and others.

As used herein, "shear thinning fluid" refers to materials that behave as a fluid with a high viscosity when low stress is applied, but the viscosity of the fluid decreases when the stress is increased. Examples of shear thinning fluids can include polymer solutions, molten polymers, suspensions, colloids, and others.

As used herein, "curable fluid" refers to fluids that can undergo a curing process to increase the viscosity of the fluid and/or cause phase change from liquid to solid. The curing process can include thermal curing, chemical curing, ultraviolet radiation curing, or other curing methods. In some examples, curable fluids can include monomers that can polymerize to form polymers and/or polymers that can become crosslinked during the curing process. Examples of curable fluids can include two-part epoxy resins, two-part polyurethane resins, ultraviolet curing epoxies, ultraviolet curing acrylates, ultraviolet curing urethanes, ultraviolet curing thiols, and others.

Methods of Directing Fluids

In accordance with other examples of the present disclosure, a method 400 of directing a working fluid through a metered volume microfluidic device includes flowing 410 a working fluid through an inflow channel and into a metered volume chamber, flowing 420 excess working fluid not retained by the metered volume chamber to a location beyond a capillary check valve of an overflow channel, and discharging 430 the working fluid present in the metered volume chamber into the metered volume outflow channel without reintroducing the excess working fluid beyond the capillary check valve back into the metered volume chamber while discharging the working fluid. In some examples, the method can further include trapping and separating gas from the working fluid prior to flowing the working fluid into the metered volume chamber. Furthermore, the method can include introducing a liquid-gas interface in the capillary check valve that remains therein during discharge of the working fluid from the metered volume chamber and into the metered volume outflow channel. In some examples, there may be an overflow chamber that receives excess working fluid that passes through the capillary check valve. Pumping fluids to generate the flowing of working fluid (and excess working fluid) and to discharging the working fluid from the metered volume chamber can be carried out using any of a number of pumps, but in some examples, one or more of the pumps can be a blister pack that contains a fluid. The fluid can be the working fluid, a second working fluid, a fluid used to displace another fluid, e.g., a gas, a plugging fluid in the case of closing or opening valves, etc. General fluid flow is shown by way of example in FIGS. 1 and 2. It is noted that the fluid flows shown are by example only, as more or fewer fluids and/or fluid flow paths may be implemented. Thus, in various examples, the methods of directing fluid flow can include any of the processes described above as they relate to FIGS. 1-3 herein.

Definitions

It is noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though individual members of the list are individually identified as separate and unique members. Thus, no individual member of such list should be construed as a de facto equivalent of any other member of the same list solely based on presentation in a common group without indications to the contrary.

Concentrations, amounts, and other numerical data may be expressed or presented herein in a range format. A range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

What is claimed is:

1. A metered volume microfluidic device, comprising fluid flow microfluidics, the fluid flow microfluidics including:

an inflow channel, a metered volume chamber positioned to receive working fluid from the inflow channel, a metered volume outflow channel configured to receive and direct a metered volume of the working fluid to a second chamber when the working fluid is discharged from the metered volume chamber, a venting channel configured to receive excess working fluid not retained by the metered volume chamber when the metered volume chamber is being filled via the inflow channel, and a capillary check valve positioned along the venting channel, the capillary check valve being configured to allow the excess working fluid to exit the metered volume chamber towards an overflow chamber when the metered volume chamber is being filled via the inflow channel and to prevent the excess working fluid from being reintroduced into the metered volume chamber after passing through the capillary check valve.

2. The metered volume microfluidic device of claim 1, further comprising a gas trap positioned along the inflow channel to trap gas, if present in the working fluid, prior to the working fluid being introduced into the metered volume chamber.

3. The metered volume microfluidic device of claim 1, further comprising a pumping channel to force the working fluid from the metered volume chamber and into the metered volume outflow channel.

4. The metered volume microfluidic device of claim 1, wherein the metered volume outflow channel is associated with an outflow valve to prevent or allow working fluid flow there through.

5. A metered volume microfluidic device, comprising fluid flow microfluidics, the fluid flow microfluidics including:

an inflow channel, a metered volume chamber positioned to receive working fluid from the inflow channel, a metered volume outflow channel positioned to receive and direct a metered volume of the working fluid when discharged from the metered volume chamber, and a capillary check valve to allow excess working fluid to exit the metered volume chamber when filling the metered volume chamber via the inflow channel, the capillary check valve to prevent excess working fluid that has passed there through from being reintroduced into the metered volume chamber when the working fluid is discharged into the metered volume outflow channel, wherein the capillary check valve is configured to allow a liquid-gas interface to form therein with the gas introduced from an overflow chamber and the liquid introduced from the metered volume chamber, but under conditions used to discharge the metered volume channel into the metered volume outflow channel, the liquid-gas interface remains within the capillary check valve.

6. The metered volume microfluidic device of claim 1, further comprising a wetting channel to introduce a wetting fluid into the capillary check valve.

7. The metered volume microfluidic device of claim 1, wherein the second chamber is a mixing chamber configured to mix working fluid with a reagent to form a reaction mixture and to output the reaction mixture therefrom, wherein the mixing chamber is positioned downstream from the metered volume outflow channel.

8. The metered volume microfluidic device of claim 1, wherein the fluid flow microfluidics are formed in a substrate having a microfluidic features formed therein, wherein the features formed therein are closed with a sealing layer positioned on the substrate over the microfluidic features.

9. A microfluidic system, comprising:

a metered volume microfluidic device comprising fluid flow microfluidics, the fluid flow microfluidics including:

an inflow channel, a metered volume chamber positioned to receive working fluid from the inflow channel, a metered volume outflow channel configured to receive and direct a metered volume of the working fluid to a second chamber when the working fluid is discharged from the metered volume chamber, and a capillary check valve configured to allow the excess working fluid to exit the metered volume chamber when the metered volume chamber is being filled via the inflow channel and to prevent the excess working fluid from being reintroduced into the metered volume chamber after passing through the capillary check valve; and an overflow chamber to receive the excess working fluid from the capillary check valve.

10. The microfluidic system of claim 9, wherein the overflow chamber is vented, creating an air barrier between the excess working fluid received by the overflow chamber and the working fluid retained within the metered volume chamber for metered evacuation thereof.

11. The microfluidic system of claim 9, further comprising an inflow pump to pump working fluid and any gas contained therein along the inflow channel, wherein the gas is separated therefrom and collected in a gas trap prior to the working fluid being introduced into the metered volume chamber.

12. The microfluidic system of claim 9, further comprising an outflow pump fluidly coupled with a pumping channel to force the working fluid from the metered volume chamber and into the metered volume outflow channel in a manner that does not cause the working fluid in the metered volume chamber to pass through the capillary check valve while the metered volume chamber is being evacuated.

13. A method of directing a working fluid through a metered volume microfluidic device, comprising:

flowing a working fluid through an inflow channel and into a metered volume chamber;

flowing excess working fluid not retained by the metered volume chamber to a location beyond a capillary check valve of an overflow channel; and discharging the working fluid present in the metered volume chamber into the metered volume outflow channel without reintroducing the excess working fluid beyond the capillary check valve back into the metered volume chamber while discharging the working fluid.

14. The method of claim 13, further comprising trapping and separating gas from the working fluid prior to flowing the working fluid into the metered volume chamber.

15. The method of claim 13, further comprising introducing a liquid-gas interface in the capillary check valve that remains therein during discharge of the working fluid from the metered volume chamber and into the metered volume outflow channel.

* * * * *